United States Patent [19]
Schrader et al.

[11] 3,711,582
[45] Jan. 16, 1973

[54] N-ISOPROPYL-PHOSPHORO-AMIDO-THIOATES

[75] Inventors: Gerhard Schrader, Wuppertal-Cronenberg; Ludwig Eue, Cologne-Stammheim; Helmuth Hack, Cologne-Buchheim, all of Germany; Seiichi Hirane, Tokyo, Japan; Masahiro Aya, Tokyo, Japan; Shigeo Kishino, Tokyo, Japan; Nobuo Fukazawa, Tokyo, Japan

[73] Assignee: Farbenfabriken Bayer Aktiengesellschaft, Leverkusen, Germany

[22] Filed: Oct. 20, 1969

[21] Appl. No.: 867,874

[30] Foreign Application Priority Data

Oct. 25, 1968 Japan .................................. 43/77755

[52] U.S. Cl. .................. 260/954, 71/87, 260/543 P, 260/959, 260/973, 424/218

[51] Int. Cl. .................................................. C07f 9/22
[58] Field of Search ...................................... 260/954

[56] References Cited

UNITED STATES PATENTS

| | | | |
|---|---|---|---|
| 2,908,706 | 10/1959 | Tolkmith et al. | 260/954 |
| 3,472,920 | 10/1969 | Schrader et al. | 260/954 |
| 3,322,864 | 5/1967 | Schrader | 260/954 |

*Primary Examiner*—Lewis Gotts
*Assistant Examiner*—Richard L. Raymond
*Attorney*—Burgess, Dinklage & Sprung

[57] ABSTRACT

N-isopropyl-phosphoro-amido-thioates, i.e. O-(2-nitro-4-halo-phenyl)-O-alkyl-N-isopropyl-phosphoro-amidothioates or O-(2-nitro-4-halo-phenyl)-O-alkyl-N-isopropylamido-thionophosphates, which possess herbicidal properties and which may be produced by conventional methods.

9 Claims, No Drawings

N-ISOPROPYL-PHOSPHORO-AMIDO-THIOATES

The present invention relates to and has for its objects the provision for particular new N-isopropyl-phosphoro-amido-thioates, i.e. O-(2-nitro-4-halo-phenyl)-O-alkyl-N-isopropyl-phosphoro-amido-thioates or O-(2-nitro-4-halophenyl)-O-alkyl-N-isopropyl-amido-thionophosphates, which possess herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is already known that pentachloro-phenol (A), commonly known as PCP, and 2,4-dichloro-phenyl-4'-nitrophenyl-ether (B), commonly known as NIP, as well as 2-chloro-4,6-bis(ethylamino)-1,3,5-triazine (C), commonly known as CAT or Simazin, possess herbicidal properties.

It is furthermore known from British Pat. No. 659,682 that amido-thionophosphoric acid esters of the formula

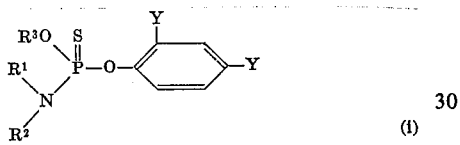

(I)

in which $R^3$ is an alkyl or alkenyl radical, $R^1$ is an alkyl radical, $R^2$ is an alkyl radical or a hydrogen atom, and one Y is a nitro radical and the other Y is a hydrogen atom or a nitro radical, possess insecticidal and fungicidal properties. In said British Patent, it is indicated only that such compounds have insecticidal and acaricidal activity as well as activity for the control of harmful fungi on plants, and that they can be used in the form of spray preparations. However, there is no actual test data showing their efficacy, and no indication that such compounds might have herbicidal activity. Furthermore, no mention is made of the applicability of such compounds to soil or of any reason to expect them to have herbicidal activity.

On the other hand, U.S. Pat. No. 3,074,790 describes compounds. for example O-(2,4-dichloro-phenyl)-O-methyl-N-isopropyl-phosphoro-amido-thioate (D), which have herbicidal properties.

In accordance with Japanese Pat. application No. 78104/66 (filed on Nov. 30, 1966), i.e. corresponding to U.S. Pat. No. 3,472,920, dated Oct. 14, 1969, it has been found that a certain derivative of this last-mentioned type of amido-thionophosphoric acid ester (which may be prepared in the same manner as the compounds of the present invention) has especially excellent herbicidal activity, to wit, O-(2-nitro-phenyl)-O-methyl-N-isopropyl-phosphoro-amido-thioate of the formula:

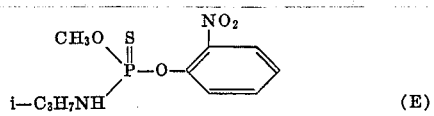

(E)

It has been found, in accordance with the present invention, that the particular new N-isopropyl-phosphoro-amido-thioates, i.e. O-(2-nitro-4-halophenyl)-O-alkyl-N-isopropyl-phosphoro-amido-thioates, of the formula

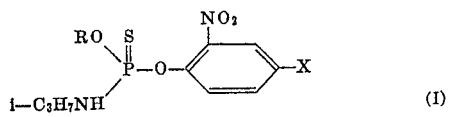

(I)

in which
R is alkyl of 1–4 carbon atoms, and
X is halo, exhibit strong herbicidal, especially selective herbicidal, properties.

It has been furthermore found, in accordance with the present invention, that the compounds of formula (I) above may be produced by the process which comprises (a) reacting an O-alkyl-W-isopropyl-amido-thionophosphoric acid ester halide of the formula

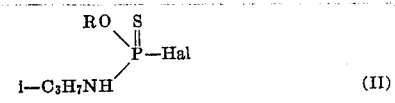

(II)

in which
R is the same as defined above, and
Hal is a halogen atom such as chloro, bromo, iodo or fluoro, especially chloro,
with a 2-nitro-4-halo-phenol of the formula

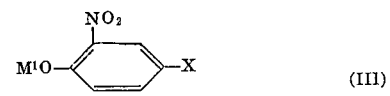

(III)

in which
X is the same as defined above, and
$M^1$ is hydrogen, or a cation such as an ammonium or alkali metal cation, for example potassium, sodium, and the like;
or (b) reacting an N-isopropyl-amido-thionophosphoric acid dihalide of the formula

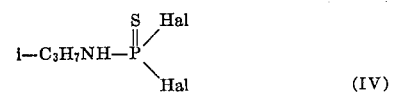

(IV)

in which
Hal is the same as defined above,
with a 2-nitro-4-halo-phenol of formula (III) and then with an alcoholate of the formula:

(V)

in which
R is the same as defined above, and
$M^2$ is a cation such as an alkali metal cation, for example potassium, sodium, and the like, or with the alcoholate of formula (V), and then with the 2-nitro-4-halo-phenol of formula (III).

Surprisingly, the particular new compounds according to the present invention show both a higher and more specific herbicidal effectiveness than the previously known compounds which are known to be usable for such purposes, e.g., compounds (A), (B) and (C) above. The instant compounds are especially effective as pre-emergence herbicides, and exhibit a remarkable effect in killing weeds, with only slight, if any, phytotoxic effect toward cultivated plants such as rice.

The instant compounds therefore represent a valuable contribution to the art.

Advantageously, in accordance with the present invention, in the various formulas herein:

R represents
straight and branched chain lower alkyl hydrocarbon of 1-4 carbon atoms such as methyl, ethyl, n- and iso-propyl, n-, iso-, sec.- and tert.-butyl, and the like, especially $C_{1-3}$ or $C_{1-2}$ alkyl; and X represents
halo such as chloro, bromo, iodo and fluoro, especially chloro, bromo and iodo, and more especially chloro and bromo.

The reaction course according to process variant (a) is illustrated by the following formula scheme:

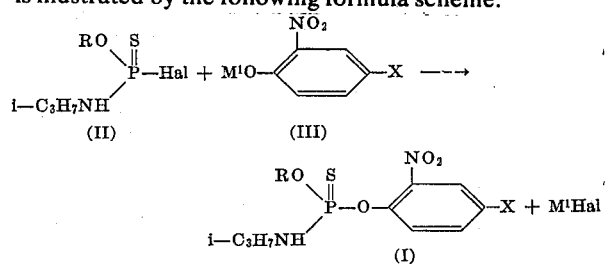

The starting materials which may be used for reaction variant (a) are clearly characterized by formulas (II) and (III) above, and are well known.

The reaction course according to process variant (b) is illustrated by the following formula scheme:

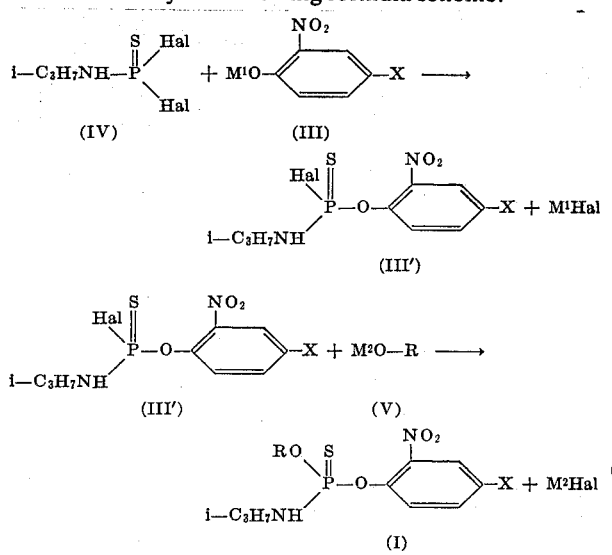

The reaction course of the alternative of variant (b) is illustrated by the following formula scheme:

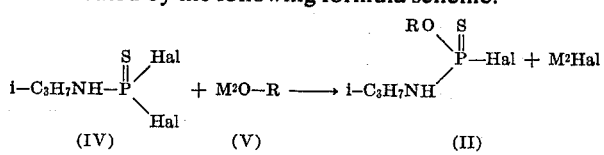

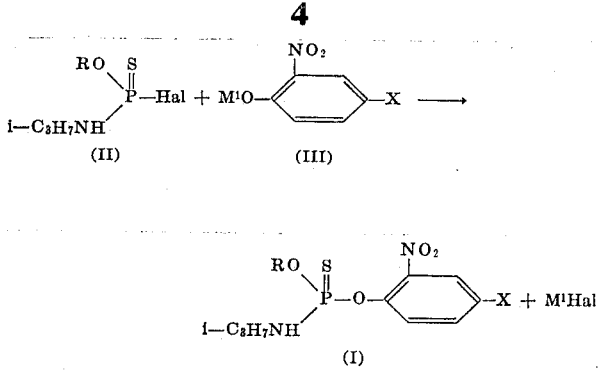

The starting materials which may be used for reaction variant (b) and the alternative of reaction variant (b) are clearly characterized by formulas (IV) and (V) above, and are well known.

As examples of O-alkyl-N-isopropyl-amido-thionophosphoric phosphoric acid ester halides of formula (II) above which may be used as starting materials, there are mentioned: O-(methyl, ethyl, n- and iso-propyl, n-, iso-, sec.- and tert.-butyl)-N-isopropyl-amido-thionophosphoric acid ester chlorides, bromides, iodides and fluorides.

As examples of N-isopropyl-amido-thionophosphoric acid dihalides of formula (IV) above which may be used as starting materials, there are mentioned:

the corresponding di-chlorides, bromides, iodides and fluorides.

As examples of 2-nitro-4-halo-phenols of formula (III) above which may be used as starting materials, there are mentioned:

2-nitro-4-(chloro, bromo, iodo and fluoro)-phenols, and the corresponding ammonium, potassium and sodium salts thereof.

As examples of alcoholates of formula (V) above which may be used as starting materials, there are mentioned:

potassium and sodium methylate, ethylate, n- and iso-propylate, n-, iso-, sec.- and tert.-butylate.

By means of reaction variant (a), the active compounds of the present invention can be prepared easily and in markedly good yields.

Process variant (a) is preferably carried out in the presence of an inert organic solvent (this term includes a mere diluent). Examples of such solvents include aliphatic or aromatic hydrocarbons (which may be halogenated), for example benzine, methylene chloride, chloroform, carbon tetrachloride, benzene, chlorobenzene, toluene, and xylene; ethers, for example diethyl ether, dibutyl ether, dioxan, and tetrahydrofuran; aliphatic alcohols or ketones which have low boiling points, for example methanol, ethanol, isopropanol, acetone, methyl ethyl ketone, methyl isopropyl ketone, and methyl isobutyl ketone; and the like. Lower aliphatic nitriles, for example acetonitrile, propionitrile, and the like, may also be used.

If $M^1$ is hydrogen in the appropriate starting compound of formula (III) above, the reaction according to variant (a) may preferably be carried out in the presence of an acid-binding agent. Examples of these include alkali metal carbonates and bicarbonates or alcoholates, such as potassium carbonate, sodium bicarbonate, sodium carbonate, or sodium or potassium methylate or ethylate, or aliphatic, aromatic or heterocyclic tertiary bases such as triethylamine, diethylaniline, pyridine, and the like. Instead of using an acidibinding agent, a salt of the 2-nitro-4-halophenol of formula (III) above may be prepared, preferably an alkali metal or ammonium salt, and then this salt may be reacted with the starting O-alkyl-N-isopropyl-amidothiono-phosphoric acid ester halide of formula (II) above.

The reaction according to process variant (a) may be carried out within a fairly wide temperature range, but in general at temperatures from substantially between about 30°–110°C, preferably between about 40°–70°C.

In carrying out process variant (b) one may for example proceed as follows.

1 mol of alkali metal or ammonium salt of 2-nitro-4-halogenophenol of formula (III) above is dissolved in one of the above-noted solvents, preferably alcohol, and the solution is added dropwise to 1 mol of N-isopropyl-amido-thionophosphoric acid dihalide of formula (IV) above and the mixture is heated at 45°–70°C for a short time. Then the mixture is cooled to room temperature and mixed with 1 mol of alcoholic solution of alkali metal alcoholate. For completing the reaction, the reaction mixture is again heated at 40°–70°C for a short time an excess alcohol is distilled off under reduced pressure. The residue is dissolved in a water-immiscible solvent, preferably one of the aforementioned hydrocarbons or ethers, and the solution is washed with water. After washing with a solution of dilute alkali metal hydroxide or ammonium hydroxide, the organic phase is dried and finally, by removing the solvent by distillation, the desired compound is obtained as the residue.

Alternatively, the sequence of adding the starting materials for process variant (b) may be reversed. In this case, the N-isopropyl-amido-thionophosphoric acid dihalide of formula (IV) above is reacted at first with metal alcoholate solution of an alcoholate of formula (V) above, and then the intermediate product formed is reacted with the 2-nitro-4-halophenol of formula (III) above. When applying this alternative, the conditions of the reaction may be the same as those mentioned above.

Advantageously, the instant active compounds exhibit a strong herbicidal potency and can therefore be used as germination inhibiting agents or weed-killers. By weeds in the sense used herein are meant all plants which grow in places where they are not desired. Whether the active compounds according to the present invention act as total or selective herbicidal agents depends on the amount applied, as the artisan will appreciate.

The active compounds according to the present invention can be used for example in the case of the following plants: dicotyledons, such as mustard (Sinapis), cress (Lepidium), catch weed (Galium), common chickweed (Stellaria), camomile (Matricaria), French weed (Galinsoga), goose-foot (Chenopodium), stinging nettle (Urtica), groundsel (Senecio), wild amaranth (Amaranthus), common purslane (Portulaca), cotton (Gossypium), beets (Beta), carrots (Daucus), beans (Phaseolus), potatoes (Solanum), coffee (Coffea), cabbage (Brassica), spinach (Spinacia); monocotyledons, such as timothy (Phleum), meadow-grass (Poa), fescue (Festuca), finger grass (Digitaria), goosegrass (Eleusine), green foxtail (Setaria), raygrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum); and the like.

The instant compounds are preferably used as selective herbicides and especially when applied to soil before germination, although they exhibit a particularly good selectivity when applied before and after emergence, e.g., in upland and paddy fields where cucumber, tomato, carrots, radish, rice, wheat, barley, maize, beans, potatoes and cotton are cultivated.

Significantly, the active compounds of the present invention are distinguished by the fact that they are not phytotoxic to rice plants although they are markedly effective in small dosages as compared with PCP and NIP, i.e. compounds (A) and (B), etc. which have hitherto been used widely as herbicides in paddy fields. Furthermore, the same effect as with CAT or Simazin, i.e., compound (C), is generally achievable using the instant active compounds without any harm to crops when applied to soil before germination for controlling weeds in upland fields. Especially when applied to soil before germination, the instant compounds are far better than the already known herbicides in that such instant compounds show a superior selective herbicidal activity, depending on the amount applied.

The active compounds according to the present invention significantly also show a secondary insecticidal and fungicidal activity, e.g., against insects and phytopathogenic fungi which infest plants.

The active compounds according to the instant invention can be utilized, if desired, in the form of the usual formulations or compositions with conventional inert (i.e., plant compatible or herbicidally inert) pesticidal diluents or extenders, i.e., diluents or extenders of the type usable in conventional pesticidal formulations or compositions, e.g., conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g., benzene, toluene, xylene, etc.), halogenated, especially chlorinated, aromatic hydrocarbons (e.g., chloro-benzenes), paraffins (e.g., petroleum fractions), chlorinated aliphatic hydrocarbons (e.g., methylene chloride, etc.), alcohols (e.g., methanol, ethanol, propanol, butanol, etc.), ethers, ether-alcohols (e.g., glycol monomethyl ether, etc.), amines (e.g. ethanol-amine, etc.), amides (e.g., dimethyl formamide, etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, montmorillonite, clay, etc.), and ground synthetic minerals (e.g., highly dispersed silicic acid, silicates, e.g. alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as pulp sulfite waste liquors, methyl cellulose, lignin, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, acaricides, nematocides, bactericides, plant growth regulators, soil disinfectants, including phenoxy compounds, chlorophenol compounds, carbamates, diphenyl ethers, triazine compounds, and other known agricultural chemicals and/or fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95 percent by weight, and preferably 0.5 and 90 percent by weight, of the mixture, whereas carrier composition mixtures suitable for direct application or field application generally contemplate those in which the active compound is present in an amount substantially between about 0.005–10 percent, preferably 0.008–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.005–95 percent, and preferably 0.008–95 percent, by weight of the mixture.

In particular, the amount of active compound applied per unit area varies according to the purpose intended, i.e. the effect desired, and the mode of application. In general, higher quantities of substantially between about 5–40 kg of active compound per hectare are applied for total or non-selective herbicidal activity, whereas lower quantities of substantially between about 1.25–5 kg of active compound per hectare are applied for selective herbicidal activity.

The active compounds can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

While the active compounds can be used particularly effectively according to the pre-emergence method, they are also effective when used according to the post-emergence method.

Especially when application is carried out mainly before the germination of cultivated plants, the general conditions of cultivation are not so important, but the quantity of active compound to be applied per unit area and the application method are important, as the artisan will appreciate.

Furthermore, the present invention contemplates methods of selectively killing, combatting or controlling undesired plants, e.g., weeds and the like, which comprise applying to at least one of (a) such weeds and (b) their habitat, i.e., the locus to be protected, a herbicidally effective or toxic amount of the particular compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application and may be varied within a fairly wide range depending upon the weather conditions, the soil, the purpose for which the active compound is used, e.g., for total or only selective herbicidal effect, and the plants which are to be controlled or protected. Therefore, in special cases, it is possible to go above or below the aforementioned concentration ranges.

The following illustrate, without limitation, examples of formulations which may be used in accordance with the present invention:

FORMULATION A 5 percent by weight of instant compound (2), and 95 percent by weight of a mixture of talc and clay (3:1) are formulated into a dust by mixing and crushing. It is applied as is by dusting to weed and/or their habitat.

FORMULATION B 20 percent by weight of instant compound (6), 75 percent by weight of a mixture of talc and clay (3:1), 3 percent by weight of sodium alkylbenzene sulfonate, and 2 percent by weight of sodium dinaphthylmethane disulfonate are formulated into a wettable powder by mixing and crushing. It is diluted with water at the concentration of 1 to 5, and applied by spraying to weeds and/or their habitat.

FORMULATION C 20 percent by weight of instant compound (2), 75 percent by weight of xylol, and 5 percent by weight of emulsifier Sorpol (trade name of the product of Toho Kagaku Kogyo K.K., Japan: polyoxyethylenealkylarylether) are formulated into an emulsifiable concentrate by mixing and stirring. It is diluted with water at the concentration of 1 to 1,000, and applied by spraying to weeds and/or their habitat.

FORMULATION D

Instant compound (1) is dissolved in xylol, and the solution is sprayed onto clay granules while rotating and mixing so that about 10 percent by weight of the active compound is contained thereon. The granular formulation is applied by scattering on the surface of soil.

The herbicidal effectiveness of the particular new compounds of the present invention is illustrated, without limitation, by the following examples:

EXAMPLE 1

Test against weeds of paddy fields

Preparation of active compounds:
Carrier vehicle   5 parts by weight of acetone
or 5 parts by weight of talc
Emulsifier   1 part by weight of benzyloxypolyglycolether To produce a suitable preparation of the particular active compound, 1 part by weight of such active compound is mixed with the stated amount of carrier vehicle and the stated amount of emulsifier intimately, and the resulting emulsifiable concentrate or wettable powder is then diluted with water to the desired final concentration.

Test method:
Pots of 1/5,000 a. are charged with paddy field soil and then filled with water. Paddy rice seedlings (Kinmaze variety) of 3 to 4 leaves stage are transplanted into the pots under irrigated conditions. After the seedlings have taken root, seeds of barnyardgrass and broad-leaved weeds are sown and spikerush are planted in such pots simultaneously.

The preparations of the given active compound are sprayed at the rate of 500, 250 and 125 g of active compound per 10 a. onto the soil of the pots. After 3 weeks, the degree of damage against the barnyardgrass, spikerush and broad-leaved weeds and the phytotoxicity to the paddy rice are determined and characterized by the values 0 to 5, which have the following scales:

| Herbicidal efficacy | Phytotoxicity |
| --- | --- |
| 5 Plants are completely dead or no germination occurs | 5 Plant are completely dead |
| 4 Plants are partially destroyed or 20% or less germinated | 4 Remarkable damage |
| 3 Plants are remarkably damaged or 50% or less germinated | 3 Marked damage |
| 2 Plants are markedly damaged or 70% or less germinated | 2 Small damage |
| 1 Plants are slightly damaged or 90% or less germinated | 1 Slight damage |
| 0 No effect | 0 No phytotoxicity |

The particular active compounds tested and the results obtained can be seen from the following Table 1:

TABLE 1

HERBICIDAL EFFECT AGAINST WEEDS OF PADDY FIELDS AND PHYTOTOXICITY TO RICE

| Active Compound No. | Amount of active Compound in g/10 a. | Herbicidal effect | | | Phytotoxicity |
| --- | --- | --- | --- | --- | --- |
| | | barnyard grass | spikerush | broad-leaved weeds | paddy rice |
| Compounds of Invention | | | | | |
| $(1_1)$ | 500 | 5 | 5 | 5 | 0 |
| | 250 | 5 | 5 | 5 | 0 |
| | 125 | 5 | 4 | 4 | 0 |
| $(2_1)$ | 500 | 5 | 5 | 5 | 0 |
| | 250 | 5 | 5 | 5 | 0 |
| | 125 | 5 | 4 | 5 | 0 |
| $(3_1)$ | 500 | 5 | 5 | 5 | 0 |
| | 250 | 5 | 4 | 5 | 0 |
| | 125 | 5 | 4 | 4 | 0 |
| $(4_1)$ | 500 | 5 | 5 | 5 | 0 |
| | 250 | 5 | 4 | 4 | 0 |
| | 125 | 4 | 3 | 4 | 0 |
| $(5_1)$ | 500 | 5 | 5 | 5 | 0 |
| | 250 | 5 | 5 | 5 | 0 |
| | 125 | 5 | 4 | 4 | 0 |
| $(6_1)$ | 500 | 5 | 5 | 5 | 0 |
| | 250 | 5 | 5 | 5 | 0 |
| | 125 | 5 | 4 | 5 | 0 |
| $(7_1)$ | 500 | 5 | 5 | 5 | 0 |
| | 250 | 5 | 4 | 4 | 0 |
| | 125 | 4 | 3 | 4 | 0 |
| Known Compounds-Comparison | | | | | |
| (A) pentachloro phenol | 500 | 5 | 3 | 5 | 0 |
| | 250 | 3 | 0 | 2 | 0 |
| | 125 | 1 | 0 | 0 | 0 |
| (B) 2,4-dichloro-phenyl-4'-nitro-phenyl ether | 500 | 5 | 5 | 5 | 3 |
| | 250 | 5 | 5 | 5 | 1 |
| | 125 | 3 | 1 | 2 | 0 |
| Control | 0 | 0 | 0 | 0 | 0 |

NOTES:
1) Broad-leaved weeds are Monochoria, Rotala indica Koehner, pyxidaria, Gratiola japonica Miquel, etc.
2) Compounds of invention have corresponding numbers to those in Table 4 below.

EXAMPLE 2

Test against weeds of upland fields

Preparation of active compounds:
Carrier   5 parts by weight of acetone or
5 parts by weight of talc
Emulsifier   1 part by weight of benzyloxypolyglycol ether To produce a suitable preparation of the particular active compound, 1 part by weight of such active compound is mixed with the stated amount of carrier vehicle and the stated amount of emulsifier intimately, and the resulting emulsifiable concentrate (or wettable powder) is then diluted with water to the desired final concentration.

Test method:
Pots of 30 × 30 cm are charged with soil of diluvial volcanic ash. Seeds of the below-mentioned weeds, upland rice (Hataminori variety) and vegetables are sown, and then the preparations of the given active compound are sprayed at the rate of 400, 200 and 100 g of active compound per 10 a. on the surface of the soil of the pots. After 3 weeks, the herbicidal effect against various kinds of weeds and the phytotoxicity to upland rice and certain vegetables are determined and characterized by the values 0 to 5, which have the following scales:

Herbicidal efficacy
5 Plants are completely dead or no germination occurs
4 Plants are partially destroyed after germination or 20% or less germinated
3 Plants are remarkably damaged after germination or 50% or less germinated
2 Plants are markedly damaged after germination or 70% or less germinated
1 Plants are slightly damaged after germination or 90% or less germinated
0 No effect Phytotoxicity
5 Plants are completely dead or no germination occurs
4 Plants are remarkably damaged after germination or 50% or less germinated
3 Plants are markedly damaged after germination or 70% or less germinated
2 Plants are considerably damaged after germination or 70% or more germinated
1 Plants are slightly damaged after germination or 90% or more germinated
0 No phytotoxicity The particular active compounds tested and the results obtained can be seen from the following Table 2.

EXAMPLE 3

Test of pre-emergence soil treatment against various plants

To produce a suitable preparation of the particular active compound, 1 part by weight of such active compound is mixed with 5 parts by weight of solvent (acetone) and 1 part by weight of emulsifier (benzyloxypolyglycol ether), and the resulting emulsifiable concentrate is then diluted with water to the desired final concentration.

Seeds of the test plants are sown in normal soil and after 24 hours the preparation of the given active compound is sprayed onto the test plants. After 3 weeks, the degree of damage to the test plants is determined and characterized by the values 0 to 5, which have the following meaning:

0 No effect
1 Slight damage or slight growth delay
2 Marked damage or growth delay

TABLE 2

[Herbicidal effect against weeds of upland fields and phytotoxicity to various crops]

| Active compound number | Amount of active compound, g./10 a. | Herbicidal effect | | | | | Phototoxicity | | | | |
|---|---|---|---|---|---|---|---|---|---|---|---|
| | | Barnyard-grass, Echinochloa | Fingergrass, Digitaria | Dent foxtail, Setaria | Wild amaranth, Amaranthus | Common purslane, Portulaca | Upland rice | Japanese radish | Cucumber | Tomato | Carrot |
| Compounds of invention: | | | | | | | | | | | |
| (1₂) | 400 | 5 | 5 | 5 | 5 | 5 | 0 | 0 | 1 | 0 | 0 |
| | 200 | 5 | 5 | 5 | 5 | 5 | 0 | 0 | 0 | 0 | 0 |
| | 100 | 5 | 5 | 5 | 5 | 5 | 0 | 0 | 0 | 0 | 0 |
| (2₂) | 400 | 5 | 5 | 5 | 5 | 5 | 0 | 0 | 1 | 0 | 0 |
| | 200 | 5 | 5 | 5 | 5 | 5 | 0 | 0 | 0 | 0 | 0 |
| | 100 | 5 | 5 | 5 | 5 | 5 | 0 | 0 | 0 | 0 | 0 |
| (3₂) | 400 | 5 | 5 | 5 | 5 | 5 | 0 | 0 | 1 | 0 | 0 |
| | 200 | 5 | 5 | 5 | 5 | 5 | 0 | 0 | 0 | 0 | 0 |
| | 100 | 5 | 4 | 5 | 5 | 5 | 0 | 0 | 0 | 0 | 0 |
| (4₂) | 400 | 5 | 5 | 5 | 5 | 5 | 0 | 1 | 0 | 0 | 0 |
| | 200 | 5 | 5 | 4 | 5 | 5 | 0 | 0 | 0 | 0 | 0 |
| | 100 | 5 | 4 | 4 | 3-4 | 5 | 0 | 0 | 0 | 0 | 0 |
| (5₂) | 400 | 5 | 5 | 5 | 5 | 5 | 0 | 1 | 0 | 0 | 0 |
| | 200 | 5 | 5 | 5 | 5 | 5 | 0 | 0 | 0 | 0 | 0 |
| | 100 | 5 | 5 | 5 | 4 | 5 | 0 | 0 | 0 | 0 | 0 |
| (6₂) | 400 | 5 | 5 | 5 | 5 | 5 | 0 | 0 | 0 | 0 | 0 |
| | 200 | 5 | 5 | 4-5 | 4 | 5 | 0 | 0 | 0 | 0 | 0 |
| | 100 | 5 | 5 | 4-5 | 4 | 5 | 0 | 0 | 0 | 0 | 0 |
| (7₂) | 400 | 5 | 5 | 5 | 5 | 5 | 0 | 0 | 0 | 0 | 0 |
| | 200 | 5 | 5 | 4 | 4 | 5 | 0 | 0 | 0 | 0 | 0 |
| | 100 | 5 | 4 | 4 | 4 | 5 | 0 | 0 | 0 | 0 | 0 |
| Known compounds, comparison: | | | | | | | | | | | |
| (C) 2-chloro-4,6-bis(ethylamine)-1,3,5-triazine. | 100 | 5 | 5 | 5 | 5 | 5 | 2 | 3 | 2 | 2 | 2 |
| | 50 | 4 | 4 | 5 | 5 | 5 | 0 | 1 | 1 | 1 | 1 |
| (B) 2,4-dichloro-phenyl-4'-nitro-phenyl ether. | 400 | 5 | 5 | 5 | 5 | 5 | 3 | 1 | 5 | 5 | 5 |
| | 200 | 5 | 5 | 4 | 5 | 5 | 0 | 0 | 2 | 2 | 3 |
| Control | | 0 | 0 | 0 | 0 | 0 | 0 | 0 | 0 | 0 | 0 |

NOTE: Compounds of invention have corresponding numbers to those in Table 4 below.

TABLE 3

[Pre-emergence soil treatment against various plants (pot test)]

| Active compound number | Amount of active compound in kg./ha. | Wheat | Barley | Rice | Cotton | Maize | Cabbage | Echinochloa | Portulaca | Chenopodium | Stellaria | Amaranthus | Digitaria |
|---|---|---|---|---|---|---|---|---|---|---|---|---|---|
| Known compounds, Comparison: | | | | | | | | | | | | | |
| (D) O-(2,4-dichloro-phenyl)-O-methyl-N-isoproplyphosphoro-amidothioate. | 20 | 2-3 | 2-3 | 3 | 2 | 3 | 2-3 | 5 | 5 | 5 | 5 | 4 | 5 |
| | 10 | 1 | 1 | 1 | 1 | 2 | 1 | 5 | 4 | 5 | 5 | 3 | 5 |
| | 5 | 0 | 0 | 0 | 0 | 0 | 0 | 5 | 2 | 5 | 3 | 1 | 5 |
| | 2.5 | 0 | 0 | 0 | 0 | 0 | 0 | 4-5 | 0 | 3-4 | 1 | 0 | 4 |
| (E) O-(2-nitrophenyl)-O-methyl-N-isopropyl-phosphoroamido-thioate. | 1.25 | 0 | 0 | 0 | 0 | 0 | 0 | 3 | 0 | 2 | 0 | 0 | 3 |
| | 20 | 4 | 4 | 5 | 4 | 3 | 4-5 | 5 | 5 | 5 | 5 | 5 | 5 |
| | 10 | 1-2 | 2 | 3 | 2 | 2 | 2 | 5 | 5 | 5 | 5 | 5 | 5 |
| | 5 | 0 | 0 | 0 | 0 | 0 | 0 | 5 | 5 | 5 | 5 | 4-5 | 5 |
| | 2.5 | 0 | 0 | 0 | 0 | 0 | 0 | 5 | 4 | 4 | 4 | 3 | 4-5 |
| | 1.25 | 0 | 0 | 0 | 0 | 0 | 0 | 5 | 2 | 2 | 2 | 1 | 3 |
| Compounds of invention: | | | | | | | | | | | | | |
| (2₃) | 20 | 5 | 5 | 4 | 5 | 5 | 5 | 5 | 5 | 5 | 5 | 5 | 5 |
| | 10 | 1-2 | 1-2 | 1-2 | 2 | 1-2 | 1-2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 0 | 5 | 4-5 | 4-5 | 4-5 | 4-5 | 5 |
| (6₃) | 20 | 5 | 5 | 4 | 5 | 5 | 5 | 5 | 5 | 5 | 5 | 5 | 5 |
| | 10 | 1-2 | 1-2 | 1-2 | 2 | 2 | 2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 0 | 5 | 4-5 | 4-5 | 5 | 4 | 5 |
| (1₃) | 20 | 5 | 5 | 5 | 5 | 5 | 5 | 5 | 5 | 5 | 5 | 5 | 5 |
| | 10 | 2 | 2 | 2 | 2 | 2 | 2 | 5 | 5 | 5 | 5 | 5 | 5 |
| | 5 | 0 | 0 | 0 | 0 | 0 | 0 | 5 | 5 | 5 | 5 | 5 | 5 |
| | 2.5 | 0 | 0 | 0 | 0 | 0 | 0 | 5 | 5 | 5 | 5 | 5 | 5 |
| | 1.25 | 0 | 0 | 0 | 0 | 0 | 4-5 | 4 | 4 | 4 | 4 | 4 | 4-5 |

NOTE: Compounds of invention have corresponding numbers to those in Table 4 below.

3 Remarkable damage or only 50 percent germinated
4 Plants are partially destroyed after germination or only 25 percent germinated
5 Plants are completely dead or no germination occurs.

The particular active compounds tested, their amount per unit area, and the results obtained can be seen from Table 3.

The test results described in the above-mentioned Table 3 show that the compounds of the present invention have excellent selective herbicidal effect without causing any phytotoxicity to cultivated plants when used in a suitable quantity (e.g. 1.25–5 kg of active compound per hectare). Especially excellent herbicidal effect is shown against barnyardgrass (Echinochloa), fingergrass (Digitaria), wild amaranth (Amaranthus), common purslane (Portulaca), and the like.

The following further examples illustrate, without limitation, the process for producing the particular new compounds of the present invention.

EXAMPLE 4 [REACTION VARIANT (a)]

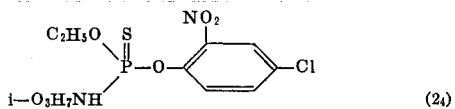
(2₄)

17.5 g (0.01 mol) of 2-nitro-4-chloro-phenol are dissolved in 100 ml of acetonitrile, and 14.0 g of potassium carbonate are added to the resulting solution. 20 g (0.1 mol) of O-ethyl-N-isopropyl-amido-thionophosphric acid ester chloride are added dropwise at 50°–60°C with vigorous stirring. The mixture is heated at 70°C for 5 hours to complete the reaction. The inorganic salt produced is filtered off and the filtrate is distilled to remove the solvent. The residue is dissolved in 100 ml of benzene and the benzene solution is washed with 1 percent solution of sodium carbonate, and then dried over anhydrous sodium sulfate. After distilling off the benzene and recrystallizing the residue from a carbon tetrachloride/n-hexane mixture, 27 g of O-(2-nitro-4-chloro-phenyl)-O-ethyl-N-isopropyl-phosphoro-amido-thioate, m.p. 60°–61°C, are obtained.

In an analogous manner, O-(2-nitro-4-bromo-phenyl)-O-ethyl-N-isopropyl-phosphoro-amido-thioate (6₄) and O-(2-nitro-4-iodo-phenyl)-O-ethyl-N-isopropyl-phosphoro-amido-thioate (8₁) are obtained when 2-nitro-4-bromo-phenol or 2-nitro-4-iodo-phenol are used, respectively, instead of 2-nitro-4-chloro-phenol. These compounds also have similar herbicidal activity to the aforementioned compound.

EXAMPLE 5 [REACTION VARIANT (a)]

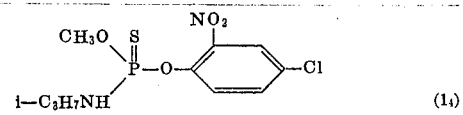
(1₄)

86 g (0.5 mol) of 2-nitro-4-chloro-phenol are dissolved in 400 ml of acetonitrile, and 80 g of dried and sifted potassium carbonate are added to the resulting solution. 95 g (0.5 mol) of O-methyl-N-isopropyl-amido-thionophosphoric acid ester chloride are added dropwise at 50°–60°C, with vigorous stirring. The mixture is heated at 60°C for 3 hours to complete the reaction. The inorganic salt produced is filtered off and the filtrate is distilled to remove the solvent. The residue is dissolved in 100 ml of benzene. The benzene solution is washed with a 1 percent aqueous solution of sodium carbonate and dried over anhydrous sodium sulfate. After distilling off the benzene and recrystallizing the residue from a carbon tetrachloride/n-hexane mixture, 115 g of O-(2-nitro-4-chloro-phenyl)-O-methyl-N-isopropyl-phosphoro-amido-thioate, m.p. 59°–60°C, are obtained.

In an analogous manner, O-(2-nitro-4-chloro-phenyl)-O-isopropyl-N-isopropyl-phosphoro-amido-thioate (3₃), having similar herbicidal activity and m.p. 67°–69 °C, is obtained when the corresponding O-isopropyl-N-isopropyl-amido-thiono-phosphoric acid ester chloride is used instead of O-methyl-N-isopropyl-amido-thionophosphoric acid ester chloride.

The following Table 4 illustrates appropriate data for typical compounds of the present invention.

TABLE 4

| Compound | Structural formula | Chemical name | Physical property |
|---|---|---|---|
| (1₅) | CH₃O, S, P–O–(phenyl with NO₂ and Cl), i-C₃H₇NH | O-(2-nitro-4-chlorophenyl)-O-methyl-N-isopropyl-phosporoamido-thioate. | M.P. 59–60° C. |
| (2₅) | C₂H₅O, S, P–O–(phenyl with NO₂ and Cl), i-C₃H₇NH | O-(2-nitro-4-chlorophenyl)-O-ethyl-N-isopropyl-phosphoroamido-thioate. | M.P. 60–61° C. |
| (3₄) | i-C₃H₇O, S, P–O–(phenyl with NO₂ and Cl), i-C₃H₇NH | O-(2-nitro-4-chlorophenyl)-O-isopropyl-N-isopropyl-phosphoroamido-thioate. | M.P. 67–69° C. |
| (4₃) | n-C₄H₉O, S, P–O–(phenyl with NO₂ and Cl), i-C₃H₇NH | O-(2-nitro-4-chlorophenyl)-O-n-butyl-N-isopropyl-phosphoroamido-thioate. | $n_D^{20}$ 1.5361 |
| (5₃) | CH₃O, S, P–O–(phenyl with NO₂ and Br), i-C₃H₇NH | O-(2-nitro-4-bromophenyl)-O-methyl-N-isopropyl-phosphoroamido-thioate. | M.P. 63–64° C. |

| Compound | Structural formula | Chemical name | Physical property |
|---|---|---|---|
| (6₅) | C₂H₅O, S, P—O—[phenyl(NO₂)]—Br, i-C₃H₇NH | O-(2-nitro-4-bromophenyl)-O-ethyl-N-isopropyl-phosphoroamido-thioate. | M.P. 60-63° C. |
| (7₃) | i-C₃H₇O, S, P—O—[phenyl(NO₂)]—Br, i-C₃H₇NH | O-(2-nitro-4-bromophenyl)-O-isopropyl-N-isopropyl-phosphoroamido-thioate. | |

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. N-isopropyl-phosphoro-amido-thioate of the formula

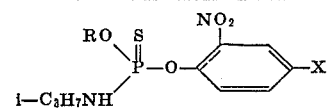

in which R is alkyl of 1-4 carbon atoms and X is chloro or bromo.

2. Compound according to claim 1 wherein X is chloro.

3. Compound according to claim 1 wherein R is methyl or ethyl and X is chloro.

4. Compound according to claim 1 wherein such compound is O-(2-nitro-4-chloro-phenyl)-O-methyl-N-isopropyl-phosphoro-amido-thioate.

5. Compound according to claim 1 wherein such compound is O-(2-nitro-4-chloro-phenyl)-O-ethyl-N-isopropyl-phosphoro-amido-thioate.

6. Compound according to claim 1 wherein such compound is O-(2-nitro-4-chloro-phenyl)-O-isopropyl-N-isopropyl-phosphoro-amido-thioate.

7. Compound according to claim 1 wherein such compound is O-(2-nitro-4-chloro-phenyl)-O-n-butyl-N-isopropyl-phosphoro-amido-thioate.

8. Compound according to claim 1 wherein such compound is O-(2-nitro-4-bromo-phenyl)-O-methyl-N-isopropyl-phosphoro-amido-thioate.

9. Compound according to claim 1 wherein such compound is O-(2-nitro-4-bromo-phenyl)-O-ethyl-N-isopropyl-phosphoro-amido-thioate.

* * * * *